(12) United States Patent
Johansson et al.

(10) Patent No.: US 6,406,582 B1
(45) Date of Patent: Jun. 18, 2002

(54) METHOD FOR APPLYING A PATTERN ONTO A SUPPORT

(76) Inventors: Göran Johansson, Måns Smeds väg 12, Kil; Patrick Johansson, Norra Karlsholmsgatan 13, Karlstad, both of (SE)

( * ) Notice: Subject to any disclaimer, the term of this patent is extended or adjusted under 35 U.S.C. 154(b) by 0 days.

(21) Appl. No.: 09/431,085

(22) Filed: Nov. 1, 1999

Related U.S. Application Data

(62) Division of application No. 09/083,961, filed on May 26, 1998, now Pat. No. 6,102,096.
(60) Provisional application No. 60/050,857, filed on Jun. 26, 1997.

(30) Foreign Application Priority Data

May 30, 1997 (SE) .............................................. 9702032

(51) Int. Cl.[7] ........................... B44C 1/165; B32B 31/00
(52) U.S. Cl. ....................... 156/230; 156/235; 156/240; 156/249; 156/257; 156/268
(58) Field of Search ................................ 156/230, 235, 156/240, 241, 247, 249, 257, 268, 289, 277, 344

(56) References Cited

U.S. PATENT DOCUMENTS

| | | |
|---|---|---|
| 708,266 A | 9/1902 | Smith |
| 2,422,676 A | 6/1947 | Haman |
| 3,531,361 A | 9/1970 | Grandinetti |
| 4,385,956 A | 5/1983 | Pearl |
| 4,591,402 A | 5/1986 | Evans |
| 4,786,537 A * | 11/1988 | Sasaki ........................ 428/40 |
| 5,143,576 A * | 9/1992 | Logan ........................ 156/353 |
| 5,211,108 A | 5/1993 | Gore |
| 5,279,699 A | 1/1994 | Taguchi et al. |
| 5,352,314 A * | 10/1994 | Coplan ........................ 156/234 |
| 5,433,817 A | 7/1995 | Biagiotti |
| 5,637,177 A | 6/1997 | Os |
| 6,258,199 B1 * | 7/2001 | Lingamfelter et al. ...... 156/235 |

FOREIGN PATENT DOCUMENTS

| | | |
|---|---|---|
| EP | 0 480 199 | 4/1992 |
| GB | 2 099 362 | 12/1982 |
| WO | WO 93/24325 | 12/1993 |
| WO | WO 97/23858 | 7/1997 |

* cited by examiner

Primary Examiner—Richard Crispino
Assistant Examiner—Kevin Shortsle
(74) Attorney, Agent, or Firm—Nixon & Vanderhye P.C.

(57) ABSTRACT

A method for applying a pattern onto a support for a sign utilizes a foil comprising a pattern layer and a carrier layer with an adhesive layer uniting them. The pattern is cut out in the pattern layer of the foil by using a controlled cutting device, after which the foil is placed on a laminating table in an application device. A traverse is passed in controlled manner over the foil placed on the laminating table, and a self-adhesive transfer film supplied from a roll over and around a rotatably journalled press roll of a press device, is applied under pressure on the foil. The carrier layer and spill of the pattern layer are removed and the pattern parts remaining are brought into contact with the support, with the adhesive layer of the pattern parts now exposed. The press roll is then again passed over the transfer film, pattern parts and support so that the pattern parts are transferred permanently to the support, after which the transfer film is removed from the support.

22 Claims, 7 Drawing Sheets

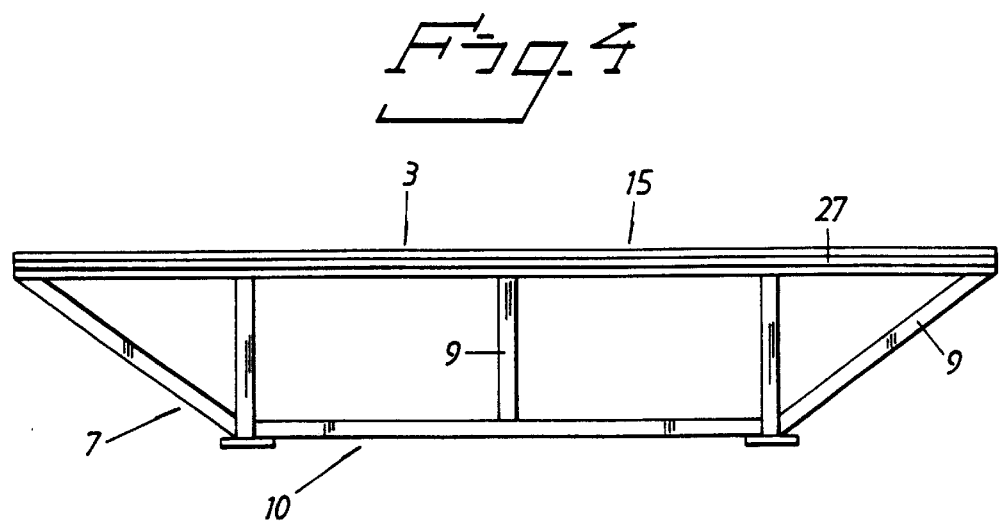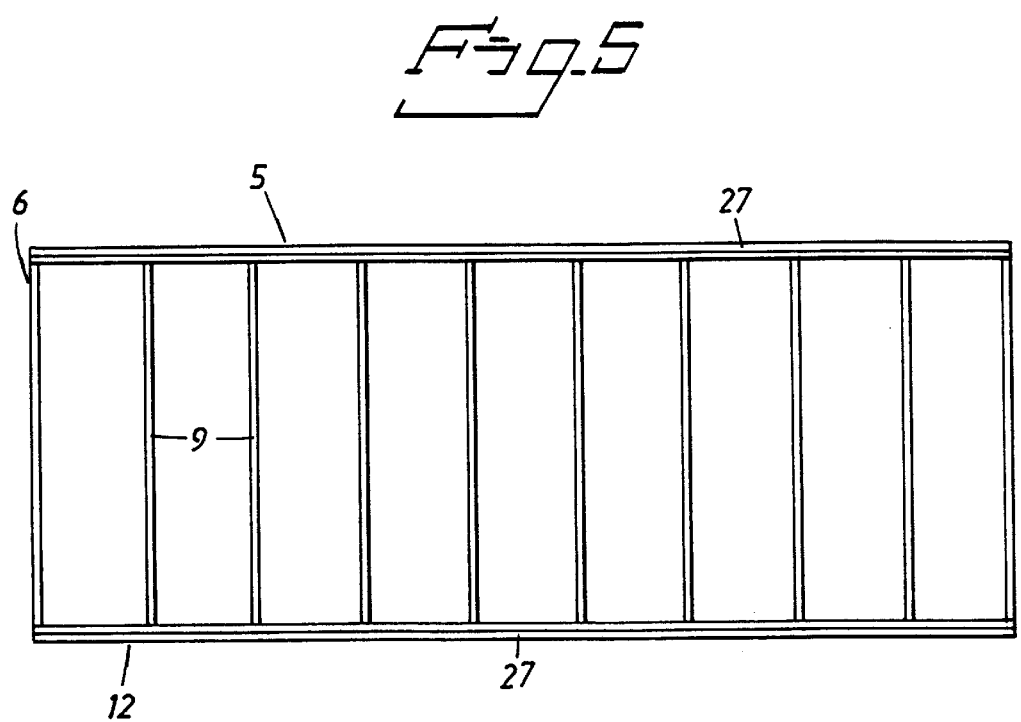

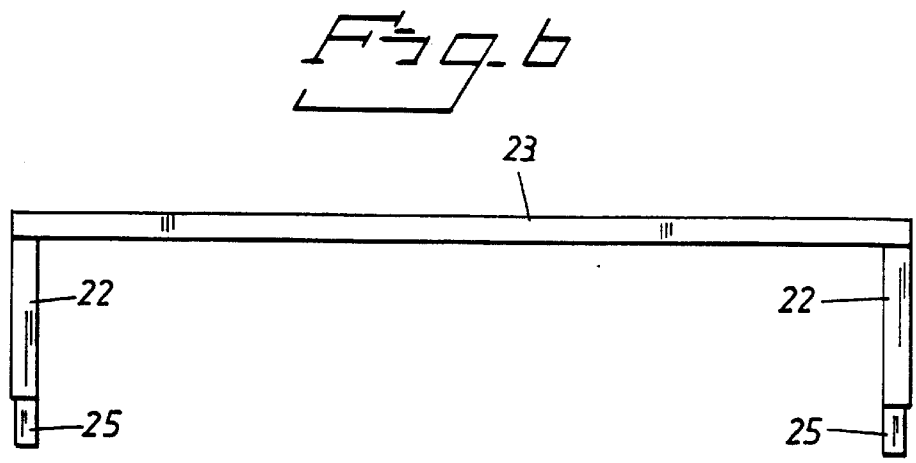
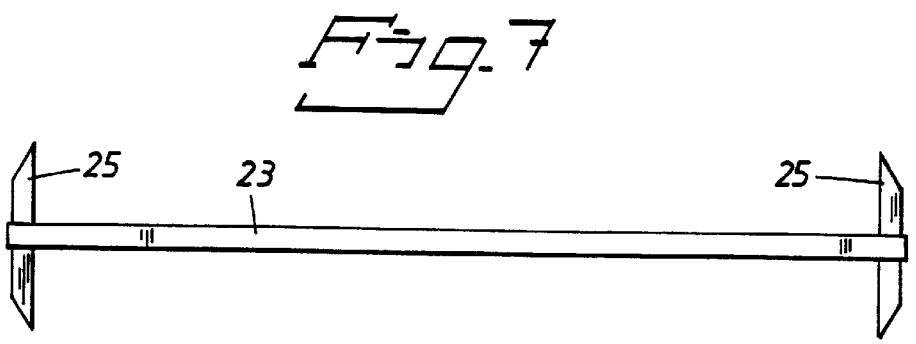
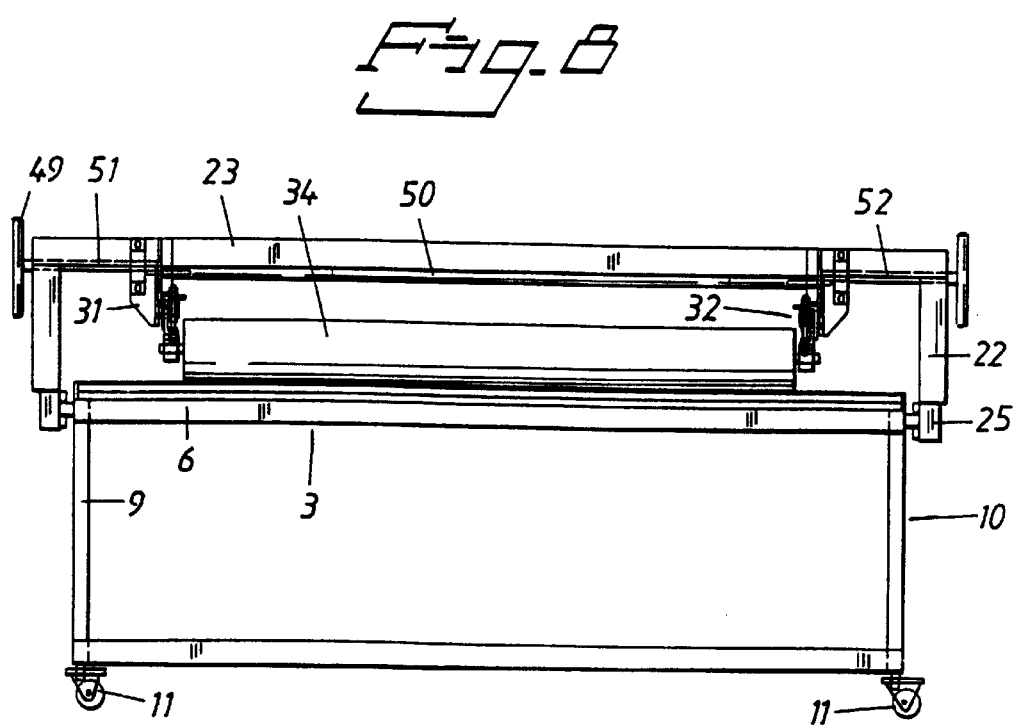

METHOD FOR APPLYING A PATTERN ONTO A SUPPORT

This is a divisional application of Ser. No. 09/083,961, filed May 26, 1998, now U.S. Pat. No. 6,102,096, the entire content of which is hereby incorporated by reference in this application.

CROSS REFERENCE TO RELATED APPLICATION

This application is based upon provisional 60/050,857 filed Jun. 26, 1997.

BACKGROUND AND SUMMARY OF THE INVENTION

The present invention relates to a method of applying a predetermined pattern onto a support means of a sign, which pattern is to form the decoration and/or information on the sign, utilising a foil comprising a pattern layer and a carrier layer with an adhesive layer uniting them, wherein parts to be included in said pattern are cut out in the pattern layer of the foil by means of a cutting device which is controlled by an electronic control unit that is pre-programmed in accordance with the predetermined pattern, after which the foil is placed on a laminating table having a flat laying-out surface in an application device with the pattern layer facing upwards.

The invention also relates to a device for applying a predetermined pattern onto a support means of a sign, which pattern is to form the decoration and/or information on the sign, utilising a foil comprising a pattern layer and a carrier layer with an adhesive layer uniting them, wherein parts to be included in said pattern are cut out in the pattern layer of the foil by means of a cutting device which is controlled by an electronic control unit that is pre-programmed in accordance with the predetermined pattern, said device comprising a laminating table having a flat laying-out surface on which the foil is placed with the pattern layer facing upwards.

A traditional stretch-fabric sign generally consists of a stand with a pair of parallel support elements anchored in said stand, a support means in the form of a flexible stretch-fabric extending in a plane between said support elements, and some form of attachment means to secure the stretch-fabric to the support elements. Two parallel edge portions of the fabric are folded around a strip enabling the edges of the fabric to be detachably connected to the support elements through said attachment means. The stretch-fabric, intended to carry and expose information, particularly advertisements, by means of one or more self-adhesive lengths of the pattern layer of a decorative foil, also known as decor film, being applied on the sign surface of the stretch-fabric, is suitably manufactured from some weatherproof, durable material such as plastic sheeting. The lengths of decor film are produced by cutting out a desired pattern in the form of information, e.g. text, or decoration, e.g. graphics, in the upper layer of said decor foil consisting of said decor film with a thin adhesive layer facing a second layer, the backing, normally consisting of a waxed paper, without the waxed paper beneath being perforated. Cutting is effected by a foil cutter when the desired pattern has first been either entered into or created in an electronic control unit, usually a computer connected to the foil cutter. The decor foil cut in this way is then placed on a table, together with the stretch-fabric. A transfer film with a self-adhesive, non-permanent layer of adhesive on one surface of the transfer film is applied over the entire surface of the pattern layer so that a laminate is formed consisting of the foil and the transfer film. Said transfer film is generally rolled up with the adhesive layer facing in towards the centre of the roll so that the outside of the roll is always free from adhesive. The wax paper of the foil is then removed so that the permanent adhesive surface of the pattern layer is exposed either by removing all the wax paper at once, as is the case if the pattern to be applied covers only a small surface, or, in the case of larger pattern areas, by the permanent adhesive surface being gradually exposed as the pattern layer is applied on the surface of the support means. During removal of the wax paper the cut-out parts of the pattern layer which are to form the desired pattern are pressed out manually from said foil using a hand tool, e.g. a spatula, so that they adhere to the surface of the transfer film. The parts of the pattern layer not forming the desired pattern will thus remain on the waxed paper and are discarded together with the paper. When the wax paper has been entirely or partially removed in the manner described above, a short length of the pattern layer adhered to the transfer film is applied on the surface of the support means, i.e. the stretch-fabric, application being performed with the aid of the spatula, while new strips of adhesive surface are applied, at the same time smoothing the whole with the spatula. When the entire pattern layer has been applied the transfer film is finally removed from the now decorated stretch-fabric.

If the finished sign is to consist of several fields of different colours, each colour must be cut out in a separate foil and then each foil must be applied individually, one after the other on the stretch-fabric. First securing and then smoothing out all the components in the sign under production has hitherto entailed extremely complicated and laborious processes. Furthermore, the less than stimulating nature of the work, has often resulted in carelessness and thus incorrect mounting of the pattern layer. The spatula may also cause scratches and even tears in the pattern layer or the stretch-fabric.

To facilitate application a lubricant, e.g. water, is generally used on the support means so that less friction is obtained between spatula and transfer film during the spatula work. A serious problem that may then arise is the formation of bubbles or blisters between the pattern layer and the stretch-fabric, caused by water or air becoming trapped between them. A hole must be made in the pattern layer to remove these blisters, allowing the enclosed liquid or air to be pressed out manually. Even if application of the pattern is performed most carefully, a few blisters containing moisture may still remain. When the sign is subsequently hung and is heated by the sun, the moisture enclosed is converted to water vapour and the bubbles gradually cause the adhesive agent to release its adhesion to the stretch-fabric, resulting in an ugly, uneven surface and a shorter service life for the sign. Furthermore, the present application method requires two people, one to apply the pattern with the spatula while the other holds the foil in position. For a sign with an area of 16 m$^2$ the total time required for the method described is estimated at about 8 hours, i.e. 4 hours per man for a work team comprising two fitters.

In another known method of applying pattern layers on stretch-fabric, an application reel-up is used where the layers are passed in together, one on top of the other, through a nip between two rubber-clad press rolls, thereby effecting adhesion between the necessary layers. However, placing the pattern layer in the press nip so that it is always correctly positioned in relation to the stretch-fabric beneath during the adhesion process is extremely complicated since the adhesive layer is exposed. Even a minute error is sufficient to cause serious lateral displacement after only a few meters of the sign-matter has passed through the press nip. This is particularly so when more than one panel of pattern layer is to be applied next to or on top of another. There is thus currently no real chance of quickly, reliably and cost-efficiently producing stretch-fabric signs with a pattern which is both detailed and in several colours.

The application reel-up described above cannot be used when working with backings for large signs since it does not allow application of pattern layers on backings larger than the width of the press rolls in the reel-up. The width of the signs is thus limited to only about 1200 mm which is the width of the rolls normally used. However, foil cutters now available can manage a foil width of up to 1372 mm and since for marketing reasons it is desirable to manufacture larger stretch-fabric signs by combining several panels of pattern layer, the reel-up method is now out of date.

The principal object of the present invention is to provide an improved method and device for applying pattern layers onto a support means for a sign so that the problems mentioned above are entirely, or at least almost entirely eliminated.

A second object of the invention is to provide a method and a device for applying pattern layers on stretch-fabric considerably wider than the application rolls now available, and at the same time enabling application of several parallel pattern layers of currently maximum width panel by panel on one and the same large support means.

A third object of the invention is to provide a method and a device that makes pattern application simpler and quicker and requires less work than hitherto in the form of time and personal.

Another object of the invention is to provide a method and a device with which the manual assembly work using hand tools such as spatulas, and lubricant, and also the damage and inconvenience often caused by said hand tools and lubricants, are greatly reduced or even completely eliminated.

The method according to the invention is characterized in that a traverse spanning the laying-out surface in the application device is passed in controlled manner over the foil placed on the laminating table, that a self-adhesive transfer film supplied from a roll over and around at least one press roll rotatably journalled at its ends and supported by a press device arranged on said traverse, is applied under pressure on the foil to produce a first laminate consisting of transfer film and foil, that said carrier layer and spill of the pattern layer are removed either together or separately, that the pattern parts thus remaining on the transfer film, adhered to its self-adhesive surface, are thereafter brought into contact with the support means on the laying-out surface with the adhesive layer of the pattern parts now exposed, that the press roll of the traverse is again passed under pressure over the second laminate thus formed, consisting of transfer film, said pattern parts and support means so that the pattern parts are transferred permanently to said support means, that during said application the press roll will be caused to press out air enclosed in the second laminate, and that the transfer film is removed from the support means.

The device according to the invention is characterized in that it comprises a traverse spanning the laying-out surface, having linearly movable devices comprising control and journalling means, said devices travelling along fixed control and carrier sections running parallel to each other along each long side of the laminating table; and a press device comprising at least one press roll rotatably journalled at its ends and operating and control means for moving the press roll between an upper inoperative position and a lower operative position in contact with the surface of the table and for controlling the pressure of the press roll against the table surface.

A saving in time of up to 75% is achieved with the present invention compared with previously known methods. Using the present invention several parallel patterns can also be simply and efficiently applied onto the support means for stretch-fabric signs that are considerably larger than the width of the press rolls currently available, since in this case the foil is placed panel by panel on the surface of the application table, after which the adjacent panels can easily be accurately fitted together before the pattern layers from said foils are fixed to the stretch-fabric with the aid of transfer film and said press roll.

Additional advantages obtained by the present invention are that lubricant such as water is no longer necessary between the pattern layer and the spatula during application, and that the material used is not damaged by scraping of the spatula or by water remaining between the pattern layer and the stretch-fabric. The work can be performed more quickly since one end of the transfer film with the ready-cut pattern thereon can be secured to the support means with the aid of the press roll. The carrier layer is then removed so that the adhesive layer is exposed and application on the stretch-fabric can be performed while the traverse with the press roll is passed over the table, thereby producing perfect adhesion of the pattern layer.

BRIEF DESCRIPTION OF THE DRAWINGS

FIG. 4 is a schematic side view of the laminating table according to FIG. 1, without support wheels.

FIG. 5 is a schematic top view of parts of the laminating table according to FIG. 4 seen from above, illustrating the frame construction with the table leaves removed.

FIGS. 6 and 7 show a side view and a top view of a traverse included in the press device shown in FIG. 1.

FIG. 8 is a schematic front view of parts of the application device according to FIG. 1 seen from the front.

DETAILED DESCRIPTION OF THE DRAWINGS

Figure 1:
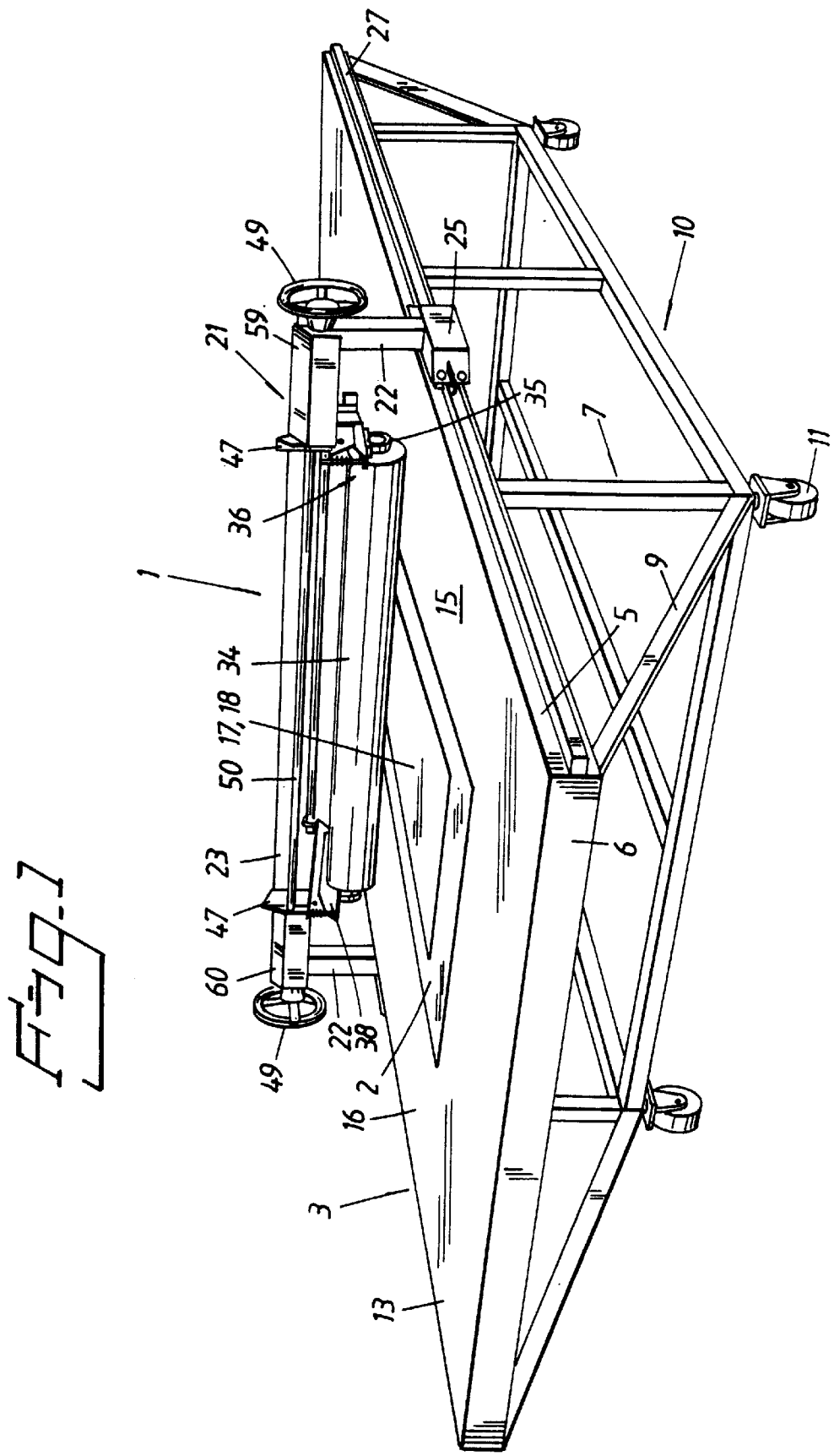
FIG. 1 is a schematic view in perspective of parts of an application device for use with the method according to the present invention, seen from one long side of the application device and comprising a press device and a laminating table.
Figure 2:
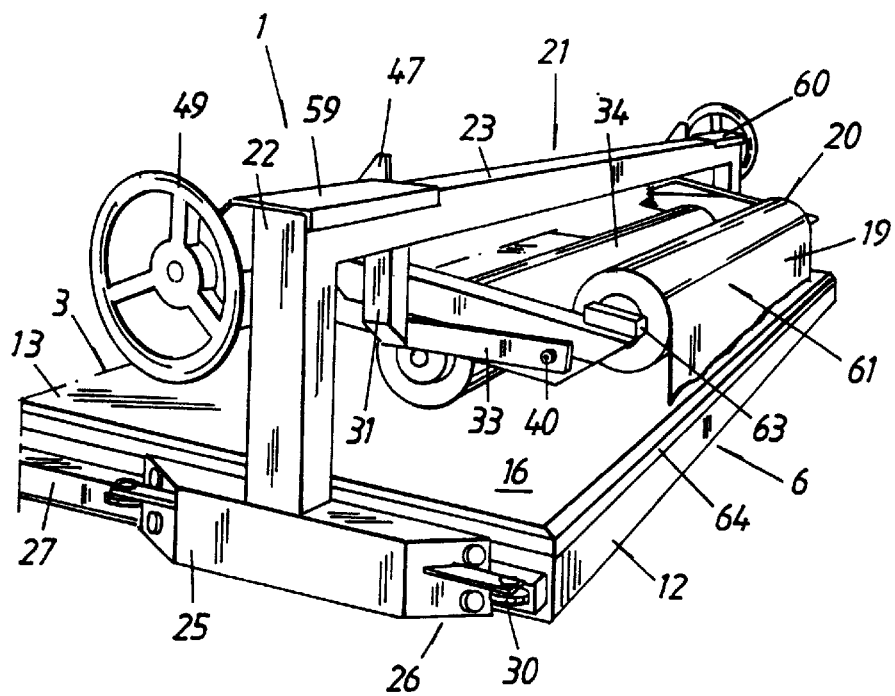
FIG. 2 is a detail in perspective of parts of the application device according to FIG. 1.
Figure 3:
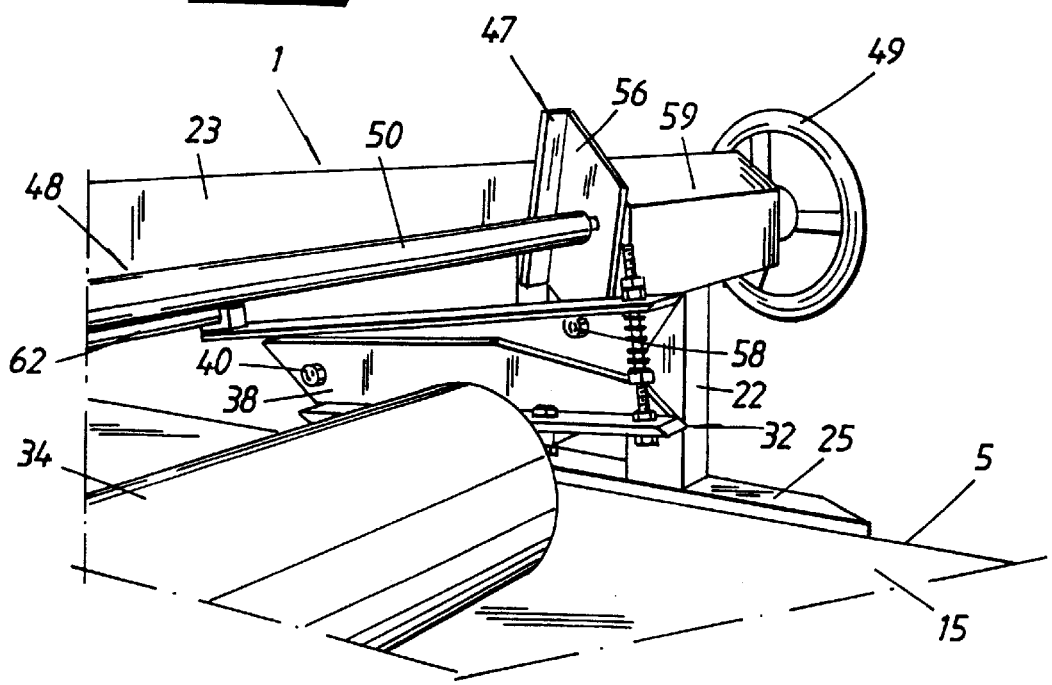
FIG. 3 is a detail in perspective of an eccentric means included in the application device according to FIG. 1.

FIGS. 1–3 show schematically in perspective parts of an application device 1 according to the invention for applying a predetermined pattern 70 on the information-carrying surface of a support means 2 of a sign intended to be used, for instance, for advertising purposes, said support means 2 consisting of a stretch-fabric 2, for instance, in a stretch-fabric sign.

The application device 1 comprises a laminating table 3 with a frame construction consisting of two pairs of parallel long sides 5 and short sides 6, said frame construction, see FIGS. 4 and 5, also including a stand 7 in the form of a frame with stays and struts 9 forming a leg stand 10 which, if necessary, may include lockable support wheels 11 to enable movement of the application device 1, and also a flat, horizontal frame 12 supported by leg stand 10 and being provided with horizontal stays, struts or the like 9 forming a base for a laying-out surface 13.

In the embodiment shown the laying-out surface 13 comprises one or more rigid plates, e.g. double layers of 22 mm building plates, to obtain an unyielding table surface 15, and a soft mat 16, suitably a plastic mat, on top covering the entire table surface 15. The plastic mat 16 shall be carefully adhered to the surface with no unevenness in its surface and shall have a suitable surface friction to enable one or more support means 2 with patterns 70 applied from one or more foils 17 described below, or some other sheet or web-shaped laminating layer(s) to be perfectly smoothed out while sliding along the surface of the mat 16, ensuring that the layers included will be completely free from spaces between them such as air bubbles.

Figure 12:
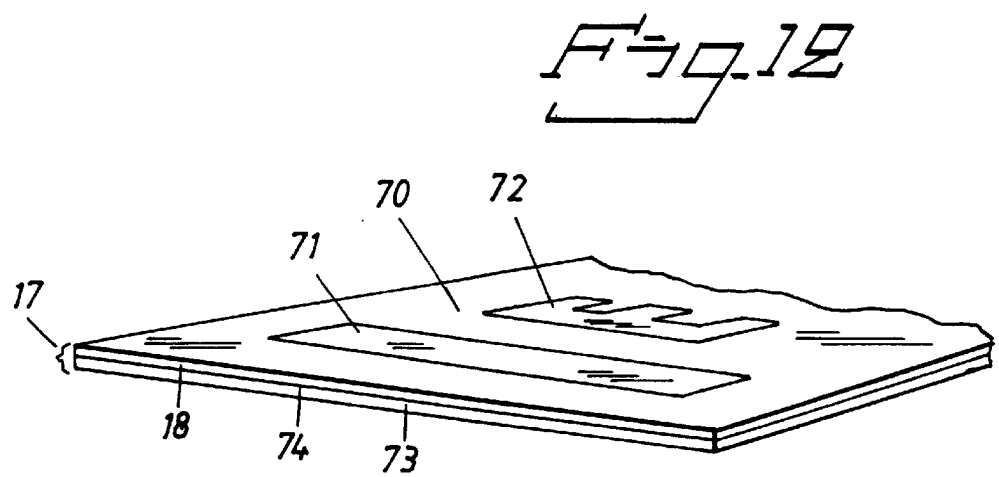
FIG. 12 is a schematic view in perspective of a foil for use in the application device according to FIG. 1, said foil comprising three layers, a pattern layer, an adhesive layer and a carrier layer, said foil also having a pattern cut in the pattern layer in the form of both decoration and information.

Said foil 17, see FIG. 12, comprises a first layer, constituting a pattern layer 18, usually of vinyl plastic, in which a pattern 70 in the form of graphic sections such as decoration 71 and/or information 72, is cut out and a second layer, constituting a carrier layer 73 suitably consisting of waxed baking paper, between which two layers 18, 73 an adhesive agent or adhesive layer 74 is applied to unite the layers. When the pattern layer 18 has been applied on the stretch-fabric surface 2 under pressure it will be substantially permanently adhered.

Figure 13:
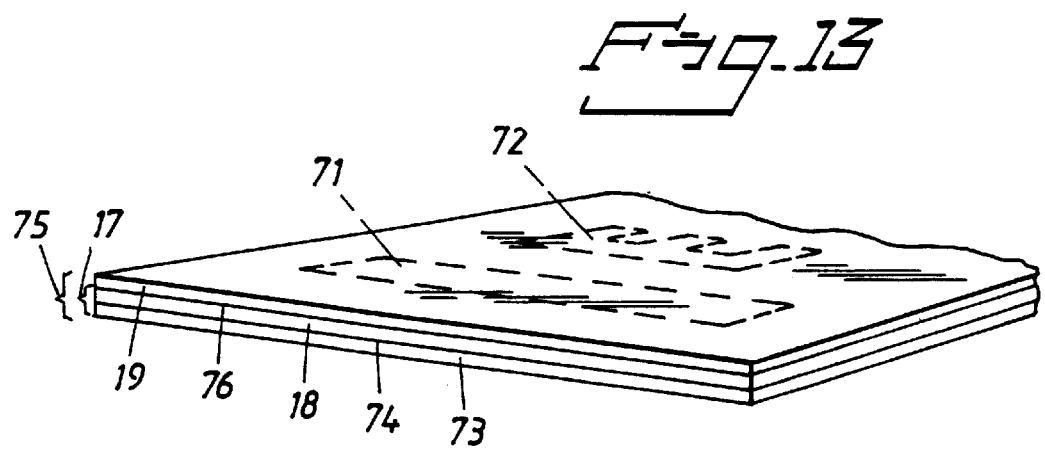
FIG. 13 is a schematic view in perspective of the foil according to FIG. 12, on which a transfer film has been applied to form a first laminate.
Figure 14:
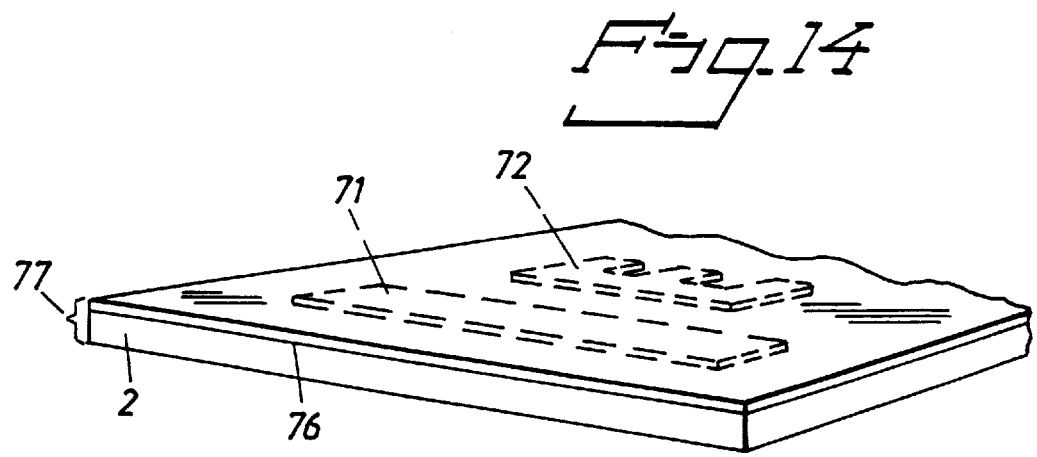
FIG. 14 is a schematic view in perspective of the first laminate according to FIG. 13, after said pattern and said transfer film have been applied onto a support means to form a second laminate.
Figure 15:
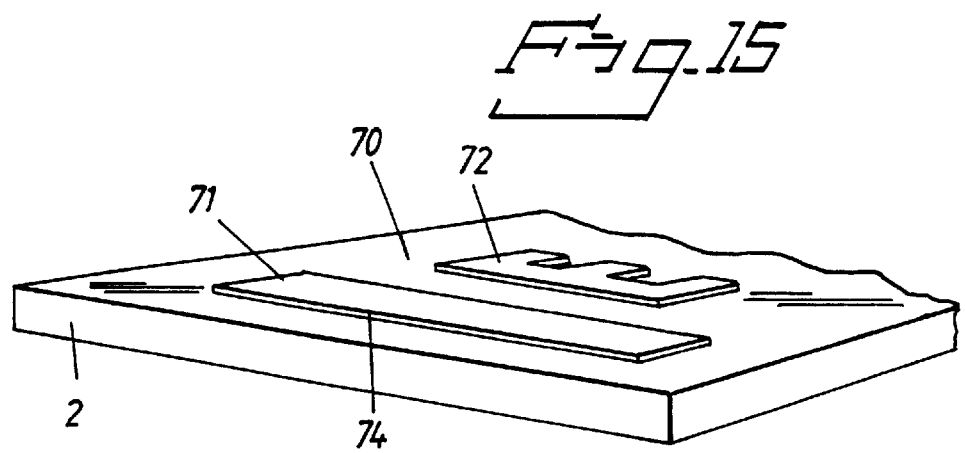
FIG. 15 is a schematic view in perspective of the second laminate according to FIG. 14, after the transfer film has been removed from said support means.

A transfer film 19, see FIGS. 13–14, the function of which is described below, is wound to an easily manageable storage roll 20, an adhesive agent or self-adhesive layer 76 having been applied on the transfer film 19, said adhesive agent or self-adhesive layer 76 consequently being protected from undesired exposure thanks to being rolled up.

The application device 1 also includes a traverse 21 which, in the embodiment shown, comprises at least two substantially vertical pillars 22 between the upper ends of which an elongate, stable, suitably horizontal boom 23 is arranged, extending across the entire width of the laying-out surface 13 of the laminating table 3, and a linearly movable device 25 comprising control and journalling means 26 being arranged at the lower ends of said pillars 22. The movable device 25 runs parallel with the table surface 15 along fixed control and carrier sections 27 running parallel to each other along each long side 5 of the laminating table 3.

In the embodiment shown, each of the control and journalling members 26 comprises two pairs of journalling members 28 movably arranged at a suitable distance from each other at the moving device 25, said journalling members 28 comprising a wheel or a roller bearing 29 on each side of said section 27, and also one or more spacer wheels or roller bearings 30 arranged against said control and carrier section 27, said journalling members 28 thus providing the requisite stability for the traverse 21 both in vertical direction and transverse to its direction of movement.

As can be seen in FIG. 2, two attachment members 31 extend vertically from the boom 23 of the traverse 21, by means of which a press device 32 is supported by substantially horizontal brackets 33 extending in jointed manner from each attachment member 31. Said brackets 33 may consist, for instance of flat bars welded to respective attachment members 31. The press device 32 comprises a power-transmitting operating an control means and a press roll 34 with flexible surface layer, e.g. rubber. In the embodiment shown said power-transmitting means comprises a mechanical construction for operation and control of the press roll 34. Alternatively the power-transmitting means may comprise pneumatic or hydraulic cylinders, belt or toothed wheel transmission means or some other equipment suitable for the purpose. In the embodiment shown said mechanical construction comprises two suspension arrangements 36. The press roll 34 is rotatably mounted by journalling means 35 on said two suspension arrangements 36, arranged on each side of the press roll 34. Each of said suspension arrangements 36 includes a pair of section elements 37, 38 which, as can be seen in FIG. 3, consist of two L-sections with a vertical and a horizontal flange pivotably connected together at one end of each L-section, e.g. by means of a bolt 40 through said vertical flanges, and with a spring and adjustment means 41 arranged at the opposite end of the section elements 37, 38 extending between the horizontal flanges of the L-sections 37, 38, giving the suspension arrangement 36 a scissors-like construction with an upper 37 and lower 38 blade consisting of said section elements 37, 38. In the embodiment shown, furthermore, each of the above-mentioned journalling means 35 for the press roll 34 is secured to the horizontal flange of the respective section element 38 by means of two bolts 43.

In the embodiment shown the spring and adjustment means 41 comprises a helical spring 44 surrounding a central, threaded strut 45 extending between said elements and through holes provided therefor in the horizontal flanges of said L-sections 37, 38. A suitable number of adjustment nuts 46 are arranged on the threaded strut 45 enabling the distance between the free ends of the elements 37, 38 to be easily adjusted, and also the force in the spring 44 to be pre-stressed to a desired value. The nip, i.e. the gap width, between the press roll 34 and the laying-out surface 13 of the laminating table 3 can in this way be adjusted with the help of the spring and adjustment means 41 to the thickness of the laminate and also the pressure exerted by the press roll 34 on the table surface 15, i.e. a desired nip pressure, can also be adjusted for the gap width set.

To activate the press device 32 with the pre-set contact pressure between the table surface 15 and the rubber roll 34, a locking device 47 is arranged on each side of the suspension arrangement 36 to be set in two positions to secure the press roll 34 in either an upper, inoperative or passive position with the press roll 34 raised from contact with the table surface 15, or a lower, operative or active position exerting pressure on the table surface 15.

Figure 9:
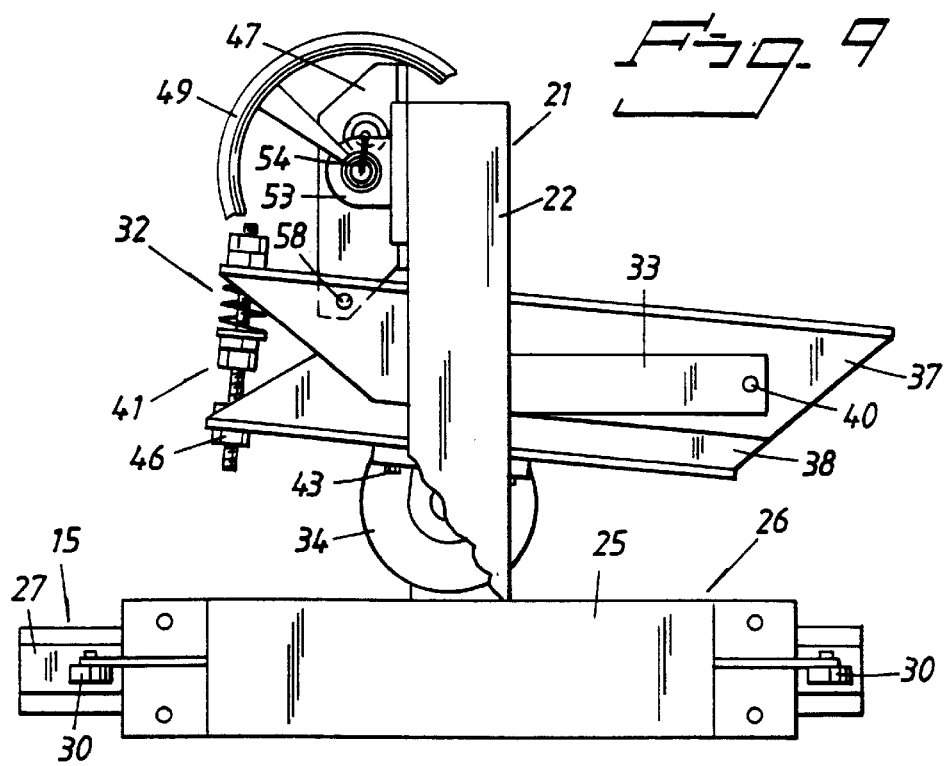
FIG. 9 is a schematic detailed view of parts of the press device according to FIG. 1, seen from the side, in a first passive position with a press roll raised from contact with the laminating table.
Figure 10:
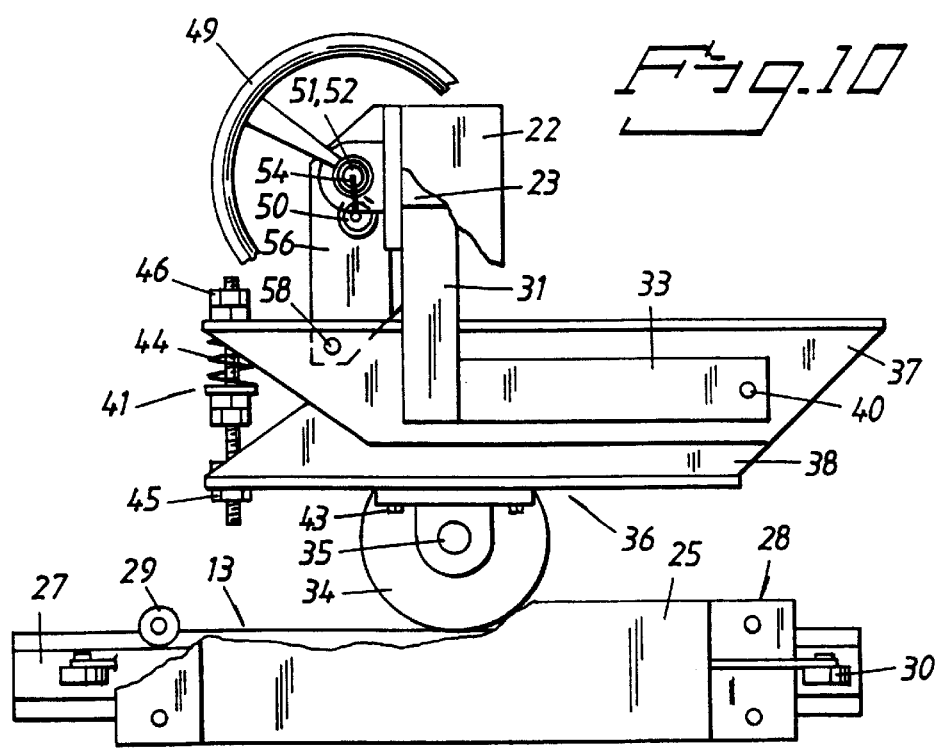
FIG. 10 is a detailed view of parts of the press device according to FIG. 9, seen from the side, in a second active position with the press roll lowered so that linear pressure is obtained on the laminating table and on the laminate placed thereon.
Figure 11:
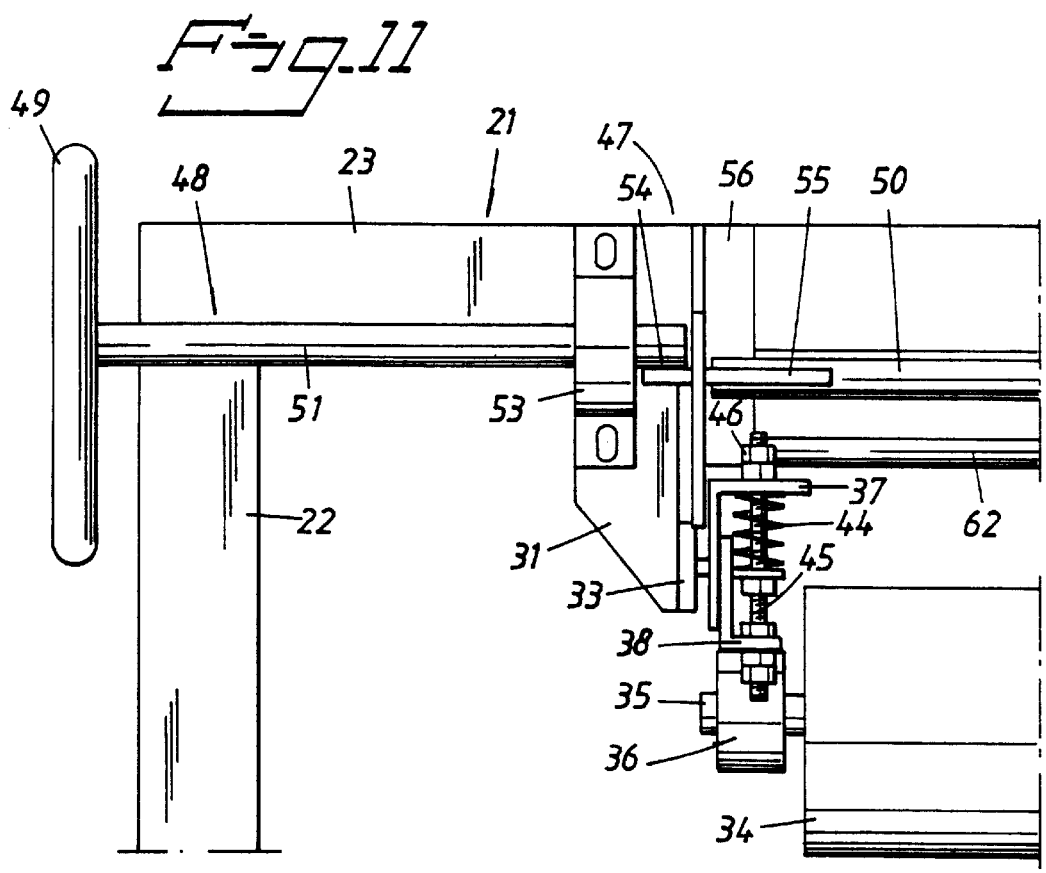
FIG. 11 is a schematic detailed view of parts of the application device according to FIG. 8, seen from the side, including parts of the eccentric means, an attachment member and a suspension arrangement for the press roll.

Activation and setting of the locking device 47 is obtained, see FIGS. 9–11, by means of an eccentric device 48 comprising an actuator 49, in the shown embodiment consisting of a turnable wheel, arranged at each vertical pillar 22 of said traverse 21, three elongate members 50, 51, 52 arranged parallel to the boom 23, and suitably in the form of rods or pipes, one of which, the middle one 50, is eccentric in relation to the other two members 51, 52 thus situated outside the middle rod, said outer rods 51, 52 being pivotably secured to the horizontal boom 23 by a number of attachment means 53, see FIG. 9. Each of said rods 50, 51, 52 extends part way across the width of the laminating table 3, one after the other between said vertical pillars 22 and they are rigidly joined at the ends which will thus be located close together by means of a lever construction 54. This lever construction 54 may consist, for instance, of a smaller rod 55, see FIG. 11, welded to said ends in a manner providing the rods 50, 51 and 50, 52, respectively, with the requisite eccentricity, or said rod ends 50, 51, 52 may simply be welded together along a suitable distance of their envelope surfaces. In the embodiment shown, each of the locking devices 47 consists of an oblong, flat section 56 which, close to its upper end, is pivotably arranged on the above-mentioned small rod 55 or, in the later example, a short way in on the relevant end of the middle rod 50, and connected to the suspension arrangement 36 of the press roll 34, in its above-mentioned upper section element 37 by means of a second pivotable joint 58 arranged in the vicinity of the opposite end of the locking device 47. Turning the actuator 49 will thus cause the locking device 47 to assume either its active or its passive position in a manner described in more detail below.

To prevent any risk of clamping when operating the eccentric device 48, two flap-down lids 59, 60 are mounted in suitable manner on the horizontal boom 23, covering the outer rods 51, 52, respectively at each actuator 49.

FIG. 2, furthermore, shows a storage roll 61 for transfer film 19 arranged near said traverse 21, extending in its longitudinal direction between the above-mentioned brackets 33 in the vicinity of their outer, free ends, which storage roll 61 comprises a rod 62 parallel to the press roll 34 and suitably rotatably journalled at each upper section element 37 by means of a holder 63 of suitable type.

Application of the predetermined pattern 70 on a support means 2, e.g. a stretch-fabric 2, starts with a foil cutter first cutting out the parts 71, 72 which are to form a part of said pattern 70, in the pattern layer 18 of the foil 17, with the aid of a cutting device, e.g. a knife, controlled by an electronic control unit, suitably a computer which has been pre-programmed in accordance with the predetermined pattern 70. The program controls the cutting device in accordance with the customer's specifications either following a pattern 70 that has been scanned in, or one designed directly in the computer. If a high-precision cutter is used the height of details may be from about 3 mm and upwards.

After cutting out, the sheet of foil 17 is placed with the pattern layer 18 facing upwards on the laminating table 3 in front of the press roll 34, the press roll 34 having been previously moved to its starting position at one end of the laminating table 3 so that the storage roll 61 on the traverse 21 with the transfer film 19 thus faces away from said sheet of foil 17. A length of transfer film 19 is then pulled from the roll 61 so that it runs over and around the press roll 34, its leading end being attached to the surface of the mat 16 on the laminating table 3, by its adhesive agent 76, immediately in front of and close to the press roll 34 which is in its passive, raised position. At this stage the front edge of the transfer film 19 should be substantially parallel to the axis of rotation of the press roll 34.

One of the actuators 49 for the eccentric device 48 is then turned so that the press roll 34 is lowered to abutment with the laminating table 3, thus clamping the leading end of the transfer film 19. The rotary movement is transmitted through the one of the two outer rods 51, 52 which is rigidly connected to said actuator 49, and on to the middle rod 50 through the lever 54 described above which is rigidly fixed between said rods 50, 51 and 50, 52, respectively. The middle rod 50 is thus turned from its original position of rest, see FIG. 9, an angle of more than 180° to a new, active position of the press device 32, see FIG. 10. Since, as described above, the middle rod 50 is eccentrically attached to the two outer rods 51, 52, this turning movement will cause its central axis to move to the inside of the common axis of rotation of the rods 50, 51, 52 in relation to the horizontal boom 23 of the traverse 21. Thanks to the pre-set pressure of the spring and adjustment means 41 against the laminating table 3, the middle rod 50 will acquire an upwardly turning force that acts in a position displaced somewhat to the side of the common axis of rotation between the rod 50 and boom 23. This force will therefore have a locking effect since it presses the locking devices 47 mounted on the middle rod 50 against the horizontal boom 23 of the traverse 21, thereby fixing the locking devices 47 in this position.

When the traverse 21 is subsequently drawn over the foil 17, the self-adhesive transfer film 19 will be pulled off the storage roll 61, over the press roll 34 and down into the nip with the table surface 15 where it adheres to the cut surface of the pattern layer 18. When the transfer film 19 has been applied in this way over the entire sheet of foil 17, it is cut from the rest of the roll 20 of transfer film 19 on the storage roll 61. A first laminate 75 is thus obtained consisting, from the surface 15 of the table, of carrier layer 73, pattern layer 18 and transfer film 19. This first laminate 75 is then turned over with the carrier layer 73 uppermost, the latter then being removed so that the cut parts consisting of spill from the pattern layer 18 which shall not be adhered to the support means 2, are removed either together by allowing them to accompany said carrier layer, or separately. The pattern layer 18 remaining on the transfer film 19 now has its adhesive layer 74 exposed. The empty support means 2 on which the pattern layer 18 is to be applied, is placed on the laminating table 3 in front of and parallel to the press roll 34. If necessary it may be secured in this position with strips of tape. A narrow first edge of the transfer film 19 with the non-permanent self-adhesive layer 76 is then attached to the surface 15 of the laminating table 3 and at the same time aligned with the support means 2 and press roll 34, while the rest of the pattern 18 is kept from coming into contact with the support means 2 by laying it over the horizontal boom 23 of the traverse 21, for instance. Alignment of the foil 17 is facilitated by reference lines and measurement lines being drawn on the surface of the mat 16, by the transfer film 19 being transparent, and also since the non-permanent adhesive layer 76 enables relatively simple correction of the relative positions of the layers 2, 17, 76, 19 so that any errors can be remedied before the permanent adhesive layer 74 on the pattern layer 18 is applied on the support means 2. When the pattern layer 18 has been adjusted to its correct position in relation to the support means 2, the press roll 34 is lowered and rolled over the whole length of the pattern layer 18 under pressure against the laminating table 3. If suitable, the press roll 34 may be passed a number of times over the applied pattern layer 18 so that all the layers 2, 74, 18, 76 and 19 adhere to each other and the press roll 34 presses out all air enclosed between the layers so that no air bubbles occur. Finally, the transfer film 19 is removed from the now finished support means 2, if only one pattern layer 18 is to be applied. If several panels of the pattern layer 18 are to be attached next to the panel 18 already applied, or if other pattern layers 18 of different colours are to be applied to said support means 2, the procedure is repeated the number of times necessary until the pattern 70 for the support means, e.g. the sign fabric 2, is complete.

In an alternative embodiment of the method, to be preferred if considerable lengths of foil 17 are to be used, the cut foil 17 is laminated to the transfer film 19 above the support means 2 on the laying-out surface 13. The press device 32 with press roll 34 is placed with the aid of the traverse 21 in the middle of this first laminate 75, after which the press roll 34 is applied by lowering it to abutment with the transfer film 19 uppermost in said first laminate 75 so that this will have a first and a second part on each side of the press device 32. A first half or part of said foil 17, e.g. the left side, is laid over the boom 23, after which the carrier layer 73 is removed and cut off from this half so that its adhesive layer 74 is exposed. The press roll 34 is then passed under pressure towards and over the end of said half so that the adhesive layer 74 of the pattern layer 18 adheres to the support means 2 in a single, continuous movement to form a first part of said second laminate 77. This procedure is then repeated with the other right half or part.

Said support means 2 can be placed on the laying-out surface 13 either before or after application of the transfer film on the pattern layer 18. The cut-out parts of the pattern layer 18 not to be adhered to the support means 2, the spill, may either be removed from the cut sheet of foil 17 just before application of the transfer film 19 which is often preferable or, if greater stability is desired, after the whole pattern layer 18, including the bits to be removed, has been applied on the support means 2, by scraping them off before the adhesive layer 74 has had time to become permanent.

It is essential for the application method that the surface 15 of the laminating table 3 is provided with a material 16 having suitable surface and material properties for the purpose so that its friction, extensibility in the surface plane and elasticity perpendicular to said plane are optimum. The various laminate layers of different sorts that will be used in the application device 1 described may not adhere by suction to the table surface 15 during passage of the press roll 34, but said laminate layer shall be smoothed out in a continuous sliding movement along the surface of the mat 16 both in the direction of movement of the traverse 21 and transverse thereto, towards the long sides 5 of the laminating table 3. As mentioned above, an ordinary plastic floor mat 16 is suitable for the table surface 15 since this has suitable friction and, since it is resilient in all above-mentioned directions upon application of an external pressure, it has a smoothing effect on all flexible laminates 2, 17 placed on the table surface 15 so that any wrinkles, folds, blisters or bubbles are pressed out by the press roll 34. The table 15 may also advantageously be made with a slightly upwardly curved cross section, convex camber, with a height difference of about 1.5 mm, for instance, from the centre of the table 3 to its long sides 5.

A camber of the table surface 15 will result in any blisters being pressed out towards the long sides 5 of the laminating table 3 upon passage of the press roll, since a lower linear pressure is then obtained in the direction of said long sides 5.

In the embodiment shown cambering of the laminating table 3 has been effected by placing camber elements such as wedges or inserts with differing thicknesses, for instance, between the lowermost leaf of the table 3 which, together with the mat 16 constitutes said contact laying-out surface 13, and the horizontal stays 9 in the frame 12 forming the bottom of said contact laying-out surface 13.

To enable selection of the most suitable camber for a particular occasion, the leaves must lie relatively loosely in relation to the frame 12 of the laminating table 3 and the leaves are thus arranged along their edges so that only vertical movements and horizontal movements outside the edges of the table 3 are prevented. This is achieved by attaching an angle iron 64 with two perpendicular flanges to the frame 12 of the laminating table 3 with screws or rivets, the first vertical flange extending along all four vertical outer sides 5, 6 while the other horizontal flange of the angle iron 64 holds the edges of said leaves so that, when necessary, they can slide a short distance in the plane of the table 3 as mentioned above.

Other materials and varying material thicknesses can be laminated to each other in the described application device 1, e.g. rubber sheets, stiff plastic sheets, window glass, sheet metal, Plexiglas,. etc. may be used instead of the laminates 17, 19 described above. The application device 1 in the embodiment shown can handle layers of between 0.5 to 40 mm without requiring any adjustment of the minimum and maximum width of the nip. Larger nip sizes must be adjusted to suit the laminate being used by adjustment of the nuts 46 in the spring and adjustment means 41 described above. In principle, therefore, the laminates used may be of any material or thickness provided they have the necessary properties and a width equal to or substantially equal to the width of the laminating table 3. However, the laminating table 3 may of course be constructed to suit the requirements of the moment.

The press device 32 in the embodiment shown comprises only one press roll 34. However, if desired, the number of press rolls 34 may by increased by arranging a plurality of press rolls 34 either coaxially one after the other, or in parallel with each other across the laminating table 3. A combination of these arrangements also lies within the scope of the invention.

In another embodiment of the invention, not shown, one or more sleeves may surround the horizontal boom 23, these sleeves being displaceable along the boom 23. The above-mentioned attachment members 31 for the press device 32 are then attached to these sleeves, enabling the press roll or rolls 34 to be placed in a desired position across the surface 15 of the laminating table 3, after which said sleeves are locked to the boom 23 by means of locking screws arranged on the sleeves, e.g. in the form of wing screws, which are then screwed through the material of the sleeves to until they encounter the boom 23, thereby securing the sleeves.

Finally, the transfer film 19 may also be varied as regards the adhesive ability of its adhesive agent or adhesive layer 76 since the adhesion required varies depending on the size of the pattern parts 71, 72. Narrow, delicate details or parts 71, 72 that have been cut out need a lower adhesive ability to the transfer film 19 than larger details 71, 72. If the adhesion ability is too high there is a risk that individual details 71, 72 may have to be removed from the transfer film 19 by hand for application on the support means 2.

What is claimed is:

1. A method of applying at least one of a decoration and information on a sign substrate, utilizing a foil comprising a pattern layer united by a first adhesive to a carrier layer, and a transfer film with a self-adhesive surface, and further utilizing a cutter controlled by an electronic control unit, a laminating table having a flat layout surface, and a traverse spanning the layout surface and including at least one press roll; said method comprising:

(a) using the cutting device preprogrammed to cut a predetermined pattern including at least one of the decoration and information, cutting the foil pattern layer to form a foil having the predetermined pattern; then (b) placing the foil on the layout surface with the pattern layer facing substantially upwardly; then (c) in a controlled manner, passing the press roll under pressure over the foil on the layout surface while bringing the self-adhesive surface of the transfer film over and around the press roll into contact with the foil pattern layer, so as to form a first laminate comprising the transfer film and foil;

(d) removing the carrier layer of the foil, and any spill of the pattern layer, from the first laminate so that the foil having the predetermined pattern remains with the transfer film, and so that the first adhesive remaining with the foil having the predetermined pattern is exposed;

(e) placing the sign substrate on the layout table;

(f) bringing the exposed first adhesive of the foil having the predetermined pattern into contact with the sign substrate to produce a second pre-laminate; then (g) in a controlled manner, passing the press roll under pressure over the second pre-laminate on the layout surface so as to press air enclosed in the second pre-laminate out of the second pre-laminate, to form a second laminate comprising the transfer film, the foil having the predetermined pattern, and the sign substrate, with the foil having the predetermined pattern substantially permanently secured to the sign substrate; and then (h) removing the transfer film from the second laminate so as to provide a sign substrate with the foil predetermined pattern thereon.

2. A method as recited in claim 1 wherein (e) is practiced between (c) and (d), and further comprising between (c) and (d): (i) placing the first laminate over the sign substrate; and (j) applying the press roll on the first laminate at a central portion thereof to define a first part of the first laminate on one side of the press roll, and a second part of the first laminate on the other side of the press roll; and wherein (d), (f), and (g), are practiced by removing and cutting the carrier layer from the first part of the first laminate and bringing the exposed first adhesive therefrom into contact with the sign substrate, and passing the press rolls over the first part; and then removing and cutting the carrier layer from the second part of the first laminate, bringing the exposed adhesive from the second part into contact with the sign substrate, and passing the press roll over the second part.

3. A method as recited in claim 2 wherein (e) is practiced before (c).

4. A method as recited in claim 1 wherein (e) is practiced before (c).

5. A method as recited in claim 1 wherein (e) is practiced after (d).

6. A method as recited in claim 1 wherein the press roll has an axis of rotation; and wherein (c) and (g) are practiced by passing the axis of rotation in a substantially linear path with the axis of rotation substantially transverse to side edges of the layout surface.

7. A method as recited in claim 1 wherein that part of (d) relating to the removal of any spill of the pattern layer is practiced prior to (c).

8. A method as recited in claim 2 wherein that part of (d) relating to the removal of any spill of the pattern layer is practiced prior to (c).

9. A method as recited in claim 2 wherein the press roll has an axis of rotation; and wherein (c) and (g) are practiced by passing the axis of rotation in a substantially linear path with the axis of rotation substantially transverse to side edges of the layout surface.

10. A method as recited in claim 9 wherein that part of (d) relating to the removal of any spill of the pattern layer is practiced prior to (c).

11. A method as recited in claim 9 wherein (e) is practiced before (c).

12. A method as recited in claim 9 wherein (e) is practiced after (d).

13. A method as recited in claim 2 wherein (e) is practiced after (d).

14. A method as recited in claim 7 wherein (e) is practiced after (d).

15. A method as recited in claim 7 wherein (e) is practiced before (c).

16. A method as recited in claim 1 wherein (h) is practiced manually.

17. A method as recited in claim 1 wherein said method is practiced to produce a stretch fabric sign.

18. A method as recited in claim 2 wherein said method is practiced to produce a stretch fabric sign.

19. A method as recited in claim 6 wherein said method is practiced to produce a stretch fabric sign.

20. A method as recited in claim 7 wherein said method is practiced to produce a stretch fabric sign.

21. A method as recited in claim 1, wherein that part of (d) relating to the removal of any spill of the pattern layer is practiced by scraping the spill before the first adhesive becomes permanent.

22. A method as recited in claim 2, wherein that part of (d) relating to the removal of any spill of the pattern layer is practiced by scraping the spill before the first adhesive becomes permanent.

* * * * *